US012114767B2

(12) United States Patent
Balaguer

(10) Patent No.: US 12,114,767 B2
(45) Date of Patent: Oct. 15, 2024

(54) CLEANING BRUSH

(71) Applicant: Emily Balaguer, Riviera beach, FL (US)

(72) Inventor: Emily Balaguer, Riviera beach, FL (US)

( * ) Notice: Subject to any disclaimer, the term of this patent is extended or adjusted under 35 U.S.C. 154(b) by 0 days.

(21) Appl. No.: 18/110,874

(22) Filed: Feb. 16, 2023

(65) Prior Publication Data

US 2023/0255342 A1 Aug. 17, 2023

Related U.S. Application Data

(60) Provisional application No. 63/310,589, filed on Feb. 16, 2022.

(51) Int. Cl.

*A46B 9/02* (2006.01)
*A46B 5/00* (2006.01)
*B08B 9/087* (2006.01)

(52) U.S. Cl.

CPC .............. *A46B 9/02* (2013.01); *A46B 5/0016* (2013.01); *A46B 5/0062* (2013.01); *B08B 9/087* (2013.01); *A46B 2200/3006* (2013.01); *A46B 2200/3093* (2013.01); *B08B 2209/08* (2013.01)

(58) Field of Classification Search

CPC .... A46B 2200/3006; A46B 2200/3093; A46B 5/0016; A46B 5/0062; A46B 9/02; A46B 3/18; A46B 9/028; B08B 2209/08; B08B 9/087

See application file for complete search history.

(56) References Cited

U.S. PATENT DOCUMENTS 1,377,690 A * 5/1921 Klauberg ............. A46B 5/0025 403/150
1,652,213 A * 12/1927 Pulver ....................... A46B 5/00 15/164
1,857,584 A * 5/1932 Bolagek ................... A46B 5/00 15/164
2,584,503 A * 2/1952 Schleenbaker .......... A46B 5/00 15/164
5,253,386 A * 10/1993 LaLonde .................. A46B 9/02 15/164

FOREIGN PATENT DOCUMENTS

WO WO-2004077994 A1 * 9/2004 ............... A46B 3/18

* cited by examiner

*Primary Examiner* — Douglas Lee

(74) *Attorney, Agent, or Firm* — Barry Choobin; Patent 360

(57) ABSTRACT

A cleaning brush for cleaning containers of complex design, wherein the cleaning brush can reach hard-to-reach areas of the container. The cleaning brush includes a twisted wire and a cleaning head coupled to the twisted wire. Portions of the twisted wire and the cleaning head have bristles. The cleaning head can flex sidewards relative to the twisted wire.

18 Claims, 11 Drawing Sheets

CLEANING BRUSH

CROSS-REFERENCE TO RELATED APPLICATIONS

This application claims priority from a U.S. provisional patent application Ser. No. 63/310,589, filed on Feb. 16, 2022, which is incorporated herein by reference in its entirety.

FIELD OF INVENTION

The present invention relates to a cleaning brush, and more particularly, the present invention relates to a cleaning brush for hard-to-reach areas.

BACKGROUND

Bottle-cleaning brushes are well-known in the art of cleaning bottles. These brushes are often used to clean containers and the like. Available in varied sizes, the bottle-cleaning brushes can be inserted into long containers for providing abrasive cleaning action. The bottle cleaning brushes can be made from bristles interlocked into a twisted hard wire. The bristles are made from plastic materials while the wire can be made from metal. The twisted wire is rigid but can flex under force. Part of the brush can bend to reach difficult-to-reach areas. However, the known bottle-cleaning brushes are suitable for cleaning plain bottles only. Containers and articles of complex design, such as hookah are hard to clean with bottle brushes. For example, the hookah has a very narrow opening and a broad bottom. The stem or the neck of the hookah is long and narrow.

A need is therefore appreciated for a cleaning brush that overcomes the limitations of conventional bottle cleaning brushes.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a cleaning brush for cleaning hard-to-reach areas.

It is another object of the present invention that the cleaning brush can be adapted for cleaning different objects.

It is still another object of the present invention that the cleaning brush can have different cleaning sites.

It is yet another object of the present invention that the cleaning brush is economical to manufacture.

It is an additional object of the present invention that the cleaning brush provides for efficient cleaning.

It is a further object of the present invention that the cleaning brush has a good amount of cleaning area.

In one aspect, disclosed is a cleaning brush comprising a twisted wire having a proximal end and a distal end, the twisted wire has a top portion adjacent to the proximal end, a bottom portion adjacent to the distal end, and a middle portion extends between the top portion and the bottom portion, the middle portion has bristles, the top portion and the bottom portion are configured as handles; and a cleaning head coupled to the distal end of twisted wire. The cleaning head comprises a plate, the plate has two holes closely spaced apart from each other, the distal end of the twisted wire loops through the two holes for securing the cleaning head to the twisted wire, and a second twisted wire extends longitudinally between two ends of the plate, the second twisted wire has bristles. The cleaning brush further comprises a first sleeve encasing the top portion. The cleaning brush further comprises a second sleeve encasing the bottom portion. The first sleeve and the second sleeve are made of silicon.

In one aspect, the top portion has a proximal end portion having bristles, wherein a portion of the top portion between the proximal end portion and the middle portion is configured as the handle and extends within the first sleeve. The two holes comprise a first hole and a second hole, the first hole is adjacent to a first end of the plate and the second hole is adjacent to a second end of the plate, the second end is opposite the first end, wherein the first hole and the second hole are aligned along a longitudinal axis of the plate so that the plate is capable of flexing sidewards.

In one aspect, a distance between the first end and the first hole is more than a distance between the second end and the second hole. The bristles in the second twisted wire are longer than the bristles in the middle portion. The bristles in the second twisted wire are longer than the bristles in the middle portion, wherein the bristles in the proximal end portion are shorter than the bristles in the middle portion.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a cleaning brush that because of its unique design and structure, can clean hard-to-reach areas. The disclosed cleaning brush can easily insert through narrow sections of the container without undesired force. The disclosed cleaning brush can easily clean complex design containers, such as those having a broad bottom and a narrow neck. An example of such a container is a hookah that has a wide round bottom container and a long narrow neck/stem. The disclosed cleaning brush can efficiently clean the wide bottom container by providing a flexible cleaning head with a larger cleaning area.

Figure 1:
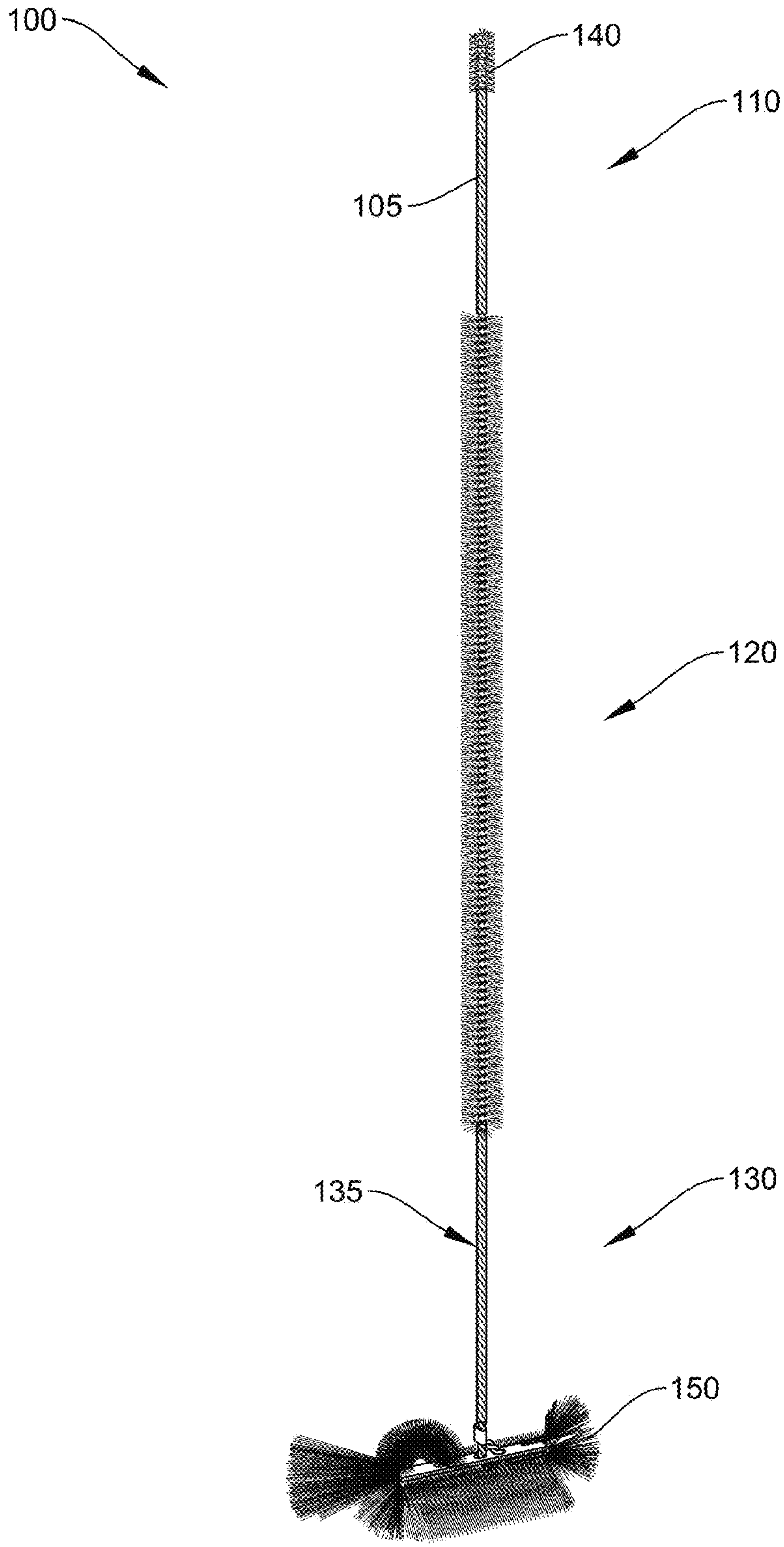
FIG. 1 is a perspective view of the cleaning brush, according to an exemplary embodiment of the present invention.

Referring to FIG. 1 is a perspective view of the disclosed cleaning brush. For understanding, the cleaning brush can be divided into three sections, an upper portion 110, a middle portion 120, and a lower portion 130. The cleaning brush 100 can be made from a long-twisted wire 105 of material, such as metal. Two or more wires can be twisted to form a braid. The bristles can be interlocked into the twisted wires. Such twisted wires are known to be used in bottle-cleaning brushes. However, the disclosed cleaning brush can have a long and strong twisted wire that can be used with long containers and articles, such as a hookah. The twisted wire can be rigid enough to prevent bending while cleaning. However, the twisted wire can bend without any recoil when force is applied. The twisted wire can although be flexible so that it can flex a little while applying force during cleaning. Bristles can be disposed along the length of the twisted wire that can be used for cleaning by providing an abrasive action. The bristles can be disposed in intervals. Moreover, the type of bristles can be varied along the length of the cleaning brush. Variations can be in the size of the bristles and the hardness of the bristles. For example, the bristles in the topmost portion of the cleaning brush can be small in size, wherein the top end of the cleaning brush can be used for cleaning narrow containers and passages. The middle portion of the cleaning brush can be provided with medium size bristles that can be suitable for cleaning most surfaces.

Figure 2:
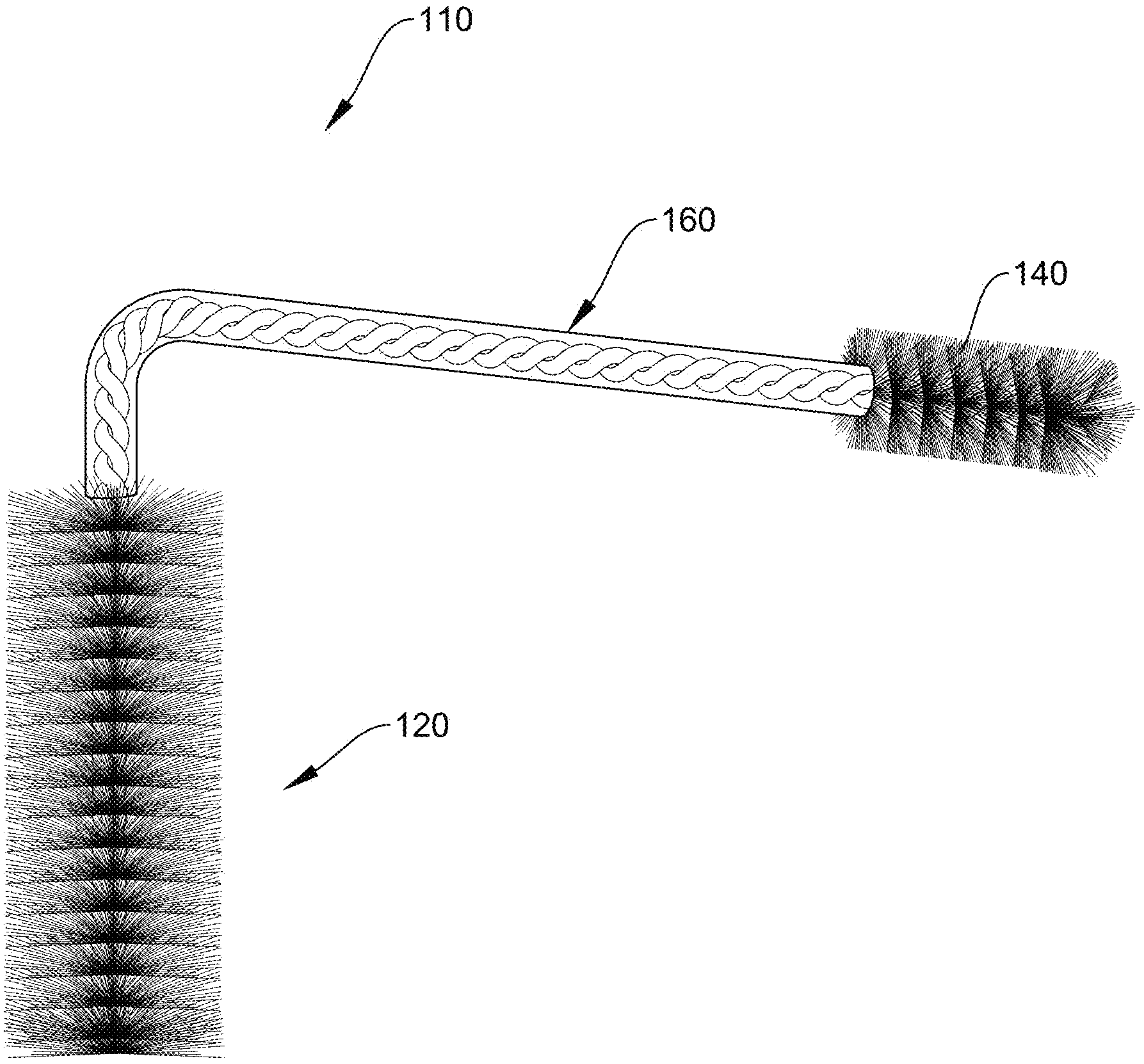
FIG. 2 shows the cleaning brush bend at the top portion, according to an exemplary embodiment of the present invention.

The top portion 110 of the cleaning brush 100 can act as a handle to hold the cleaning brush while cleaning. The proximal end portion 140 of the twisted wire can be provided with bristles so that the top portion can also be used for cleaning the narrow openings and passages. The top portion of the twisted wire can be bent as shown in FIG. 2 to hold the cleaning brush and rotate the same with the hand for cleaning. The bent top portion, as shown in FIG. 2, may provide a comfortable grip to hold the cleaning brush. The twisted wire portion between the topmost bristle portion 140 and the mid portion 120 can be provided with a grip 160, such as a silicon sleeve. The grip may make holding the cleaning brush more comfortable and ergonomic. The silicon sleeve can also protect the twisted wire from dirt, grease, and the like contaminants. Also, the silicon sleeve may prevent forming acute bends in the twisted wire which may damage it. Also, the silicon sleeve may prevent direct contact with the twisted wire to the rim of the container, which may otherwise scratch or damage the container being cleaned.

The elongated middle portion 120 can have bristles throughout, whereas the size and hardness of these bristles can be suitable for cleaning most surfaces and containers. For narrow stem containers, the mid portion can provide cleaning of the long narrow stem while the bottom portion of the cleaning brush can clean the bottom of the container.

The bottom portion 130 of the cleaning brush may have a cleaning head 150 that can be used to clean broad containers. The portion of the twisted wire between the middle portion 120 and the cleaning head 150 can be plain without any bristles. This portion can be bent under force to provide the cleaning head with a desired angle for cleaning. As shown in the drawing, the cleaning head 150 is at the distal end of the twisted wire and the plain twisted wire portion 135 is near the distal end. The cleaning brush can also be bent around the middle portion 120, while holding the handle portion 110 and the plain twisted wire portion 135, wherein the middle portion 120 forms a loop for cleaning. The top portion and the bottom portion can be grasped together, and the looped middle portion can clean a surface.

Figure 3:
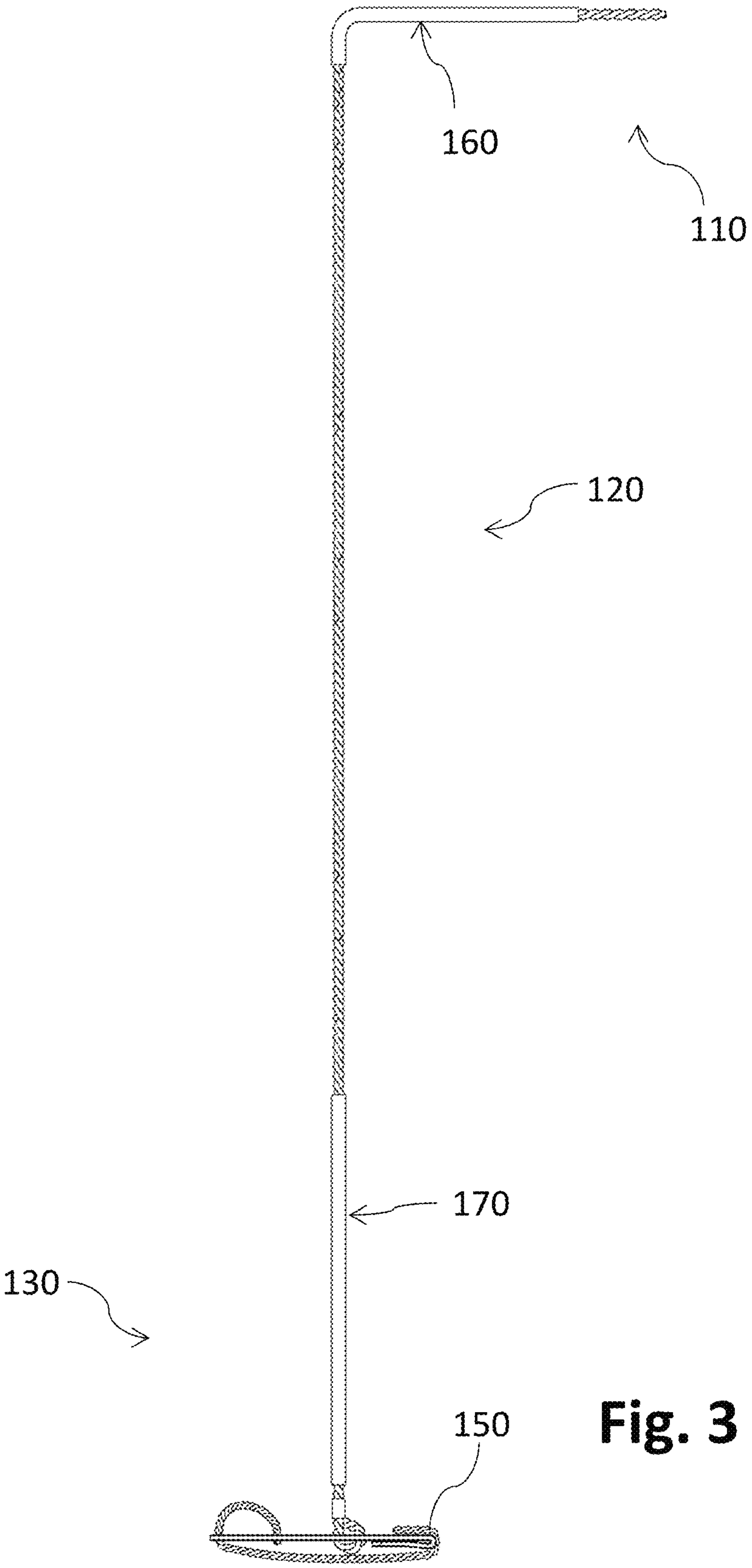
FIG. 3 is a side view of the twisted wire and cleaning head of the cleaning brush, according to an exemplary embodiment of the present invention.

The distal portion 130 of the cleaning brush 100 having the plain twisted wire portion 135 can also be provided with a sleeve (more clearly shown in FIG. 3), such as the silicon sleeve. FIG. 3 shows the cleaning brush without bristles. One sleeve 160 is shown near the proximal end of the twisted wire and another sleeve 170 is shown near the distal end of the twisted wire. The silicon sleeves, as described above, may prevent the deposition of contaminants on the twisted wire and provide a soft grip. Also, the sleeves may prevent direct contact with the twisted wire.

Figure 4:
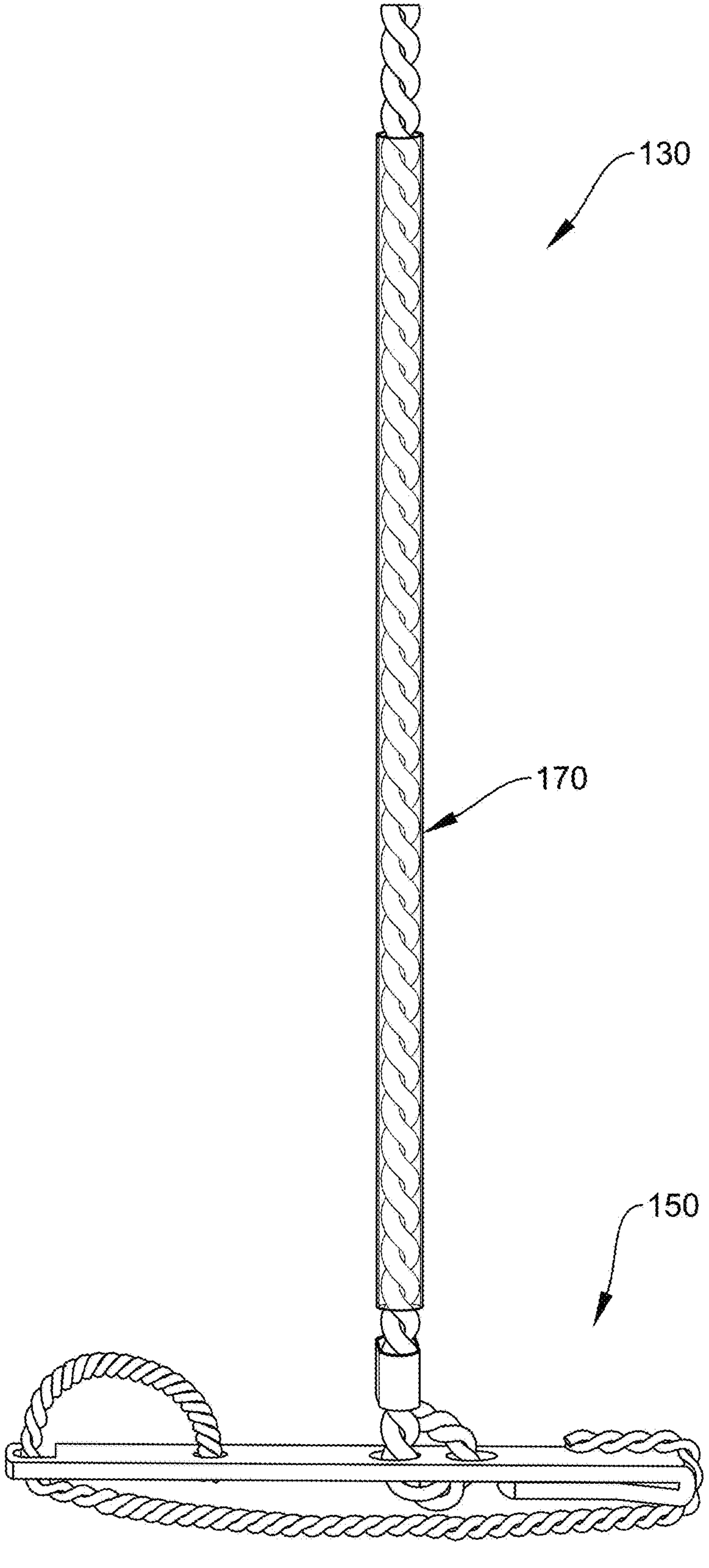
FIG. 4 is an enlarged view of a bottom portion of the cleaning brush shown in FIG. 3, according to an exemplary embodiment of the present invention.
Figure 5:
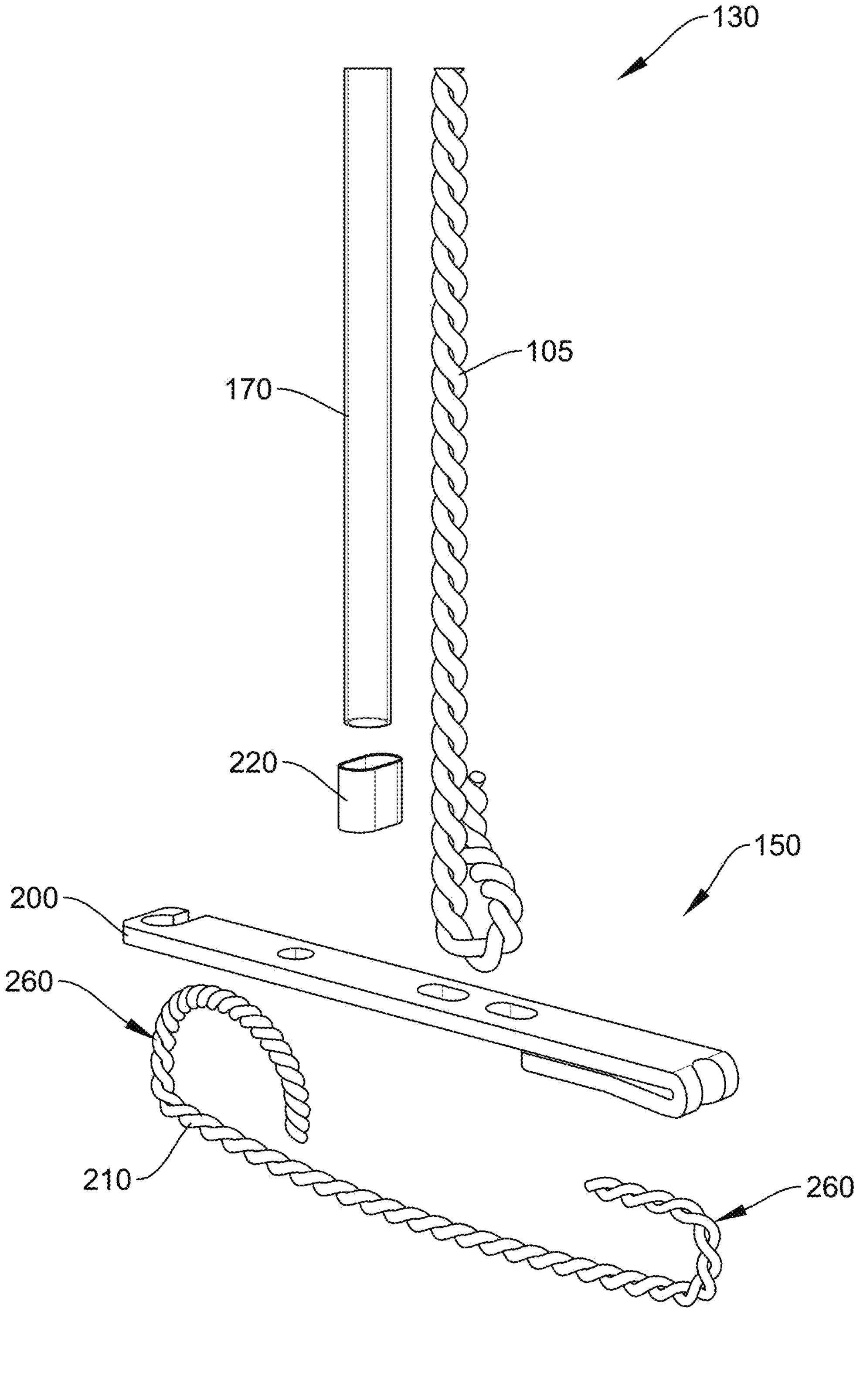
FIG. 5 is an exploded view of the middle and bottom portions of the cleaning brush, according to an exemplary embodiment of the present invention.
Figure 6A:
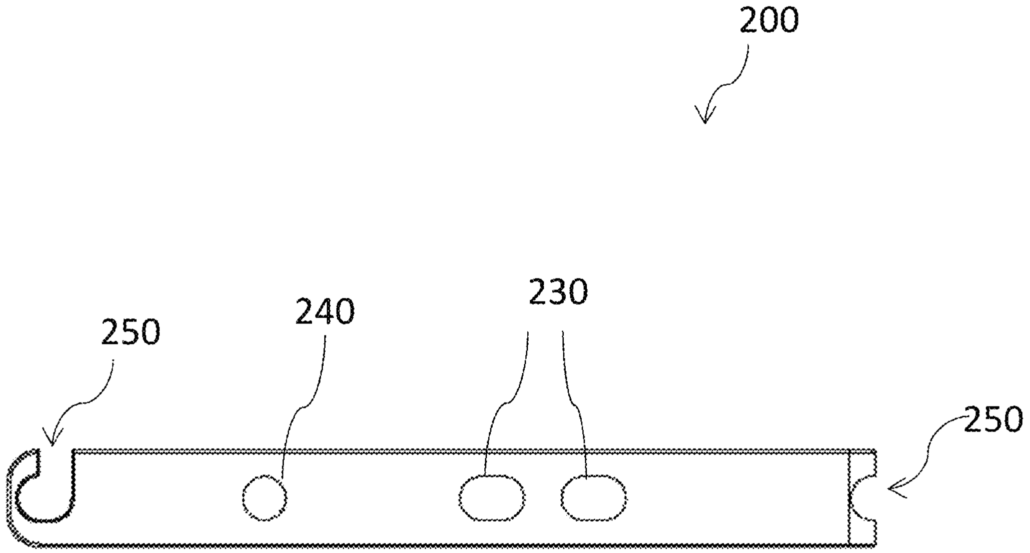
FIG. 6A is a top view of a plate of the cleaning head, according to an exemplary embodiment of the present invention.
Figure 6C:
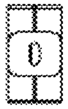
FIG. 6C is a front view of the plate of FIG. 6A, according to an exemplary embodiment of the present invention.
Figure 6B:
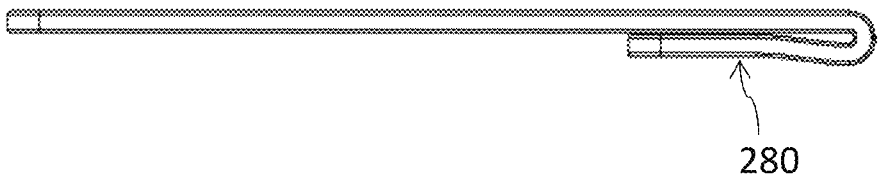
FIG. 6B is a side view of the plate of FIG. 6A, according to an exemplary embodiment of the present invention.

FIG. 4 shows an enlarged view of the distal portion 130 of the cleaning portion. As shown, the distal end of the twisted wire is coupled to the cleaning head 150. FIG. 5 is an exploded view thereof showing the twisted wire 105, the silicon sleeve 170, a crimp 220, a plate 200, and a second twisted wire 210. FIG. 6A shows the top view of the plate 200, FIG. 6B shows a side view of the plate 200, and FIG. 6C shows a front view of the plate 200. The plate 200 has a proximal end and a distal end. Two holes 230 in proximity to each other are in the central portion of the plate 200. The distal end of the twisted wire 105 can loop through these two holes 230 for securing the cleaning head 150 to the twisted wire (shown in FIG. 4). The plate 200 can flex sidewards relative to the length of the twisted wire.

The plate 200 can have cutouts 250 at its two ends wherein the second twisted wire 210 can be secured to these cutouts 250. The second twisted wire 210 has loops 260 at its two ends, wherein the two loops can be secured to the two cutouts 250 while the second twisted wire passes across the bottom of the plate. To further stabilize the second twisted wire, an end of the twisted wire can be made to insert into an offset hole 240 in plate 200. The second twisted wire can also be provided with bristles, wherein the cleaning head being flexible can easily clean wide and contoured containers, such as bowls.

Figure 7:
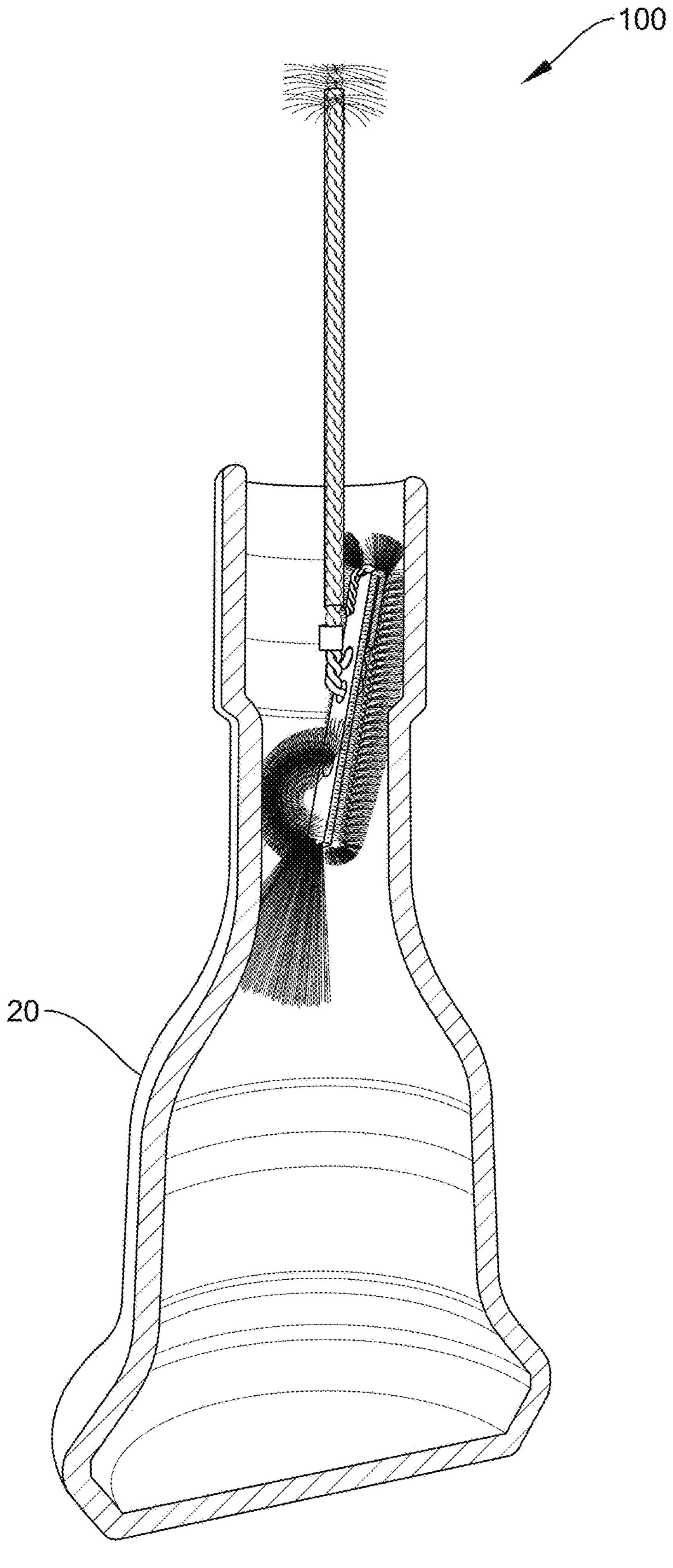
FIG. 7 illustrates the insertion of the bottom portion of the cleaning brush through a narrow opening and stem of a container, such as a hookah, according to an exemplary embodiment of the present invention.
Figure 8:
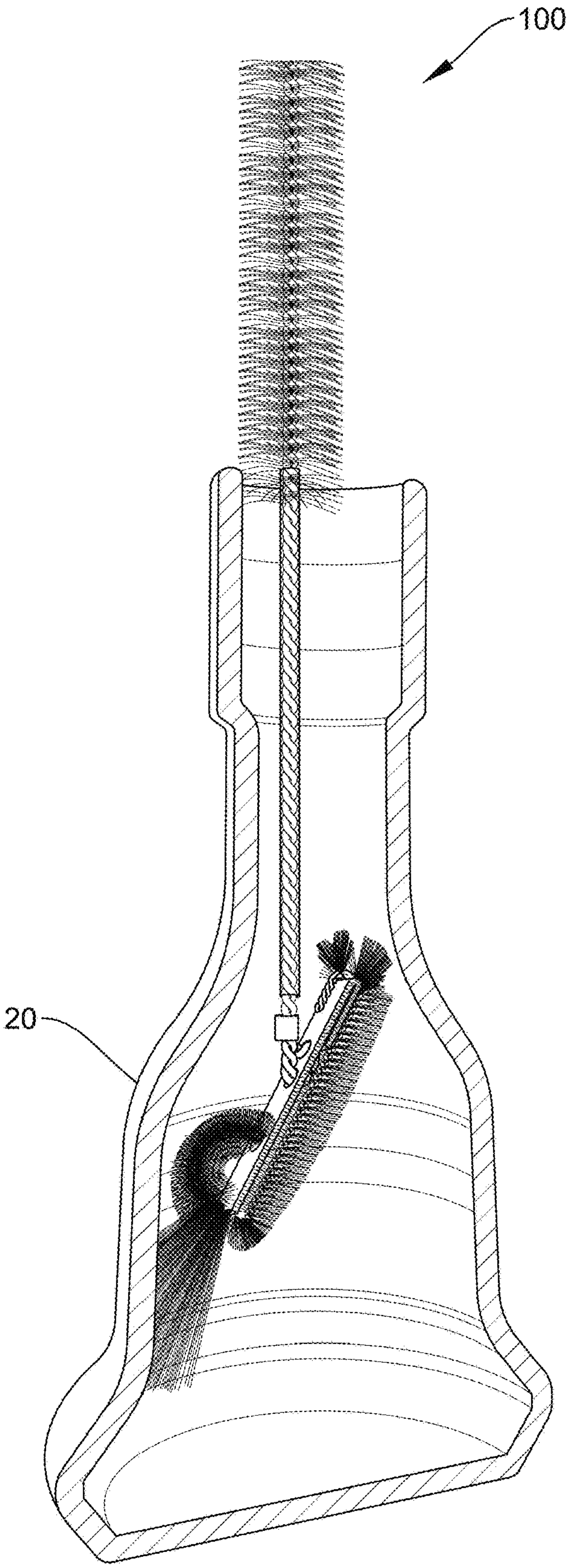
FIG. 8 illustrates further insertion of the cleaning brush into the container of FIG. 7, according to an exemplary embodiment of the present invention.
Figure 9:
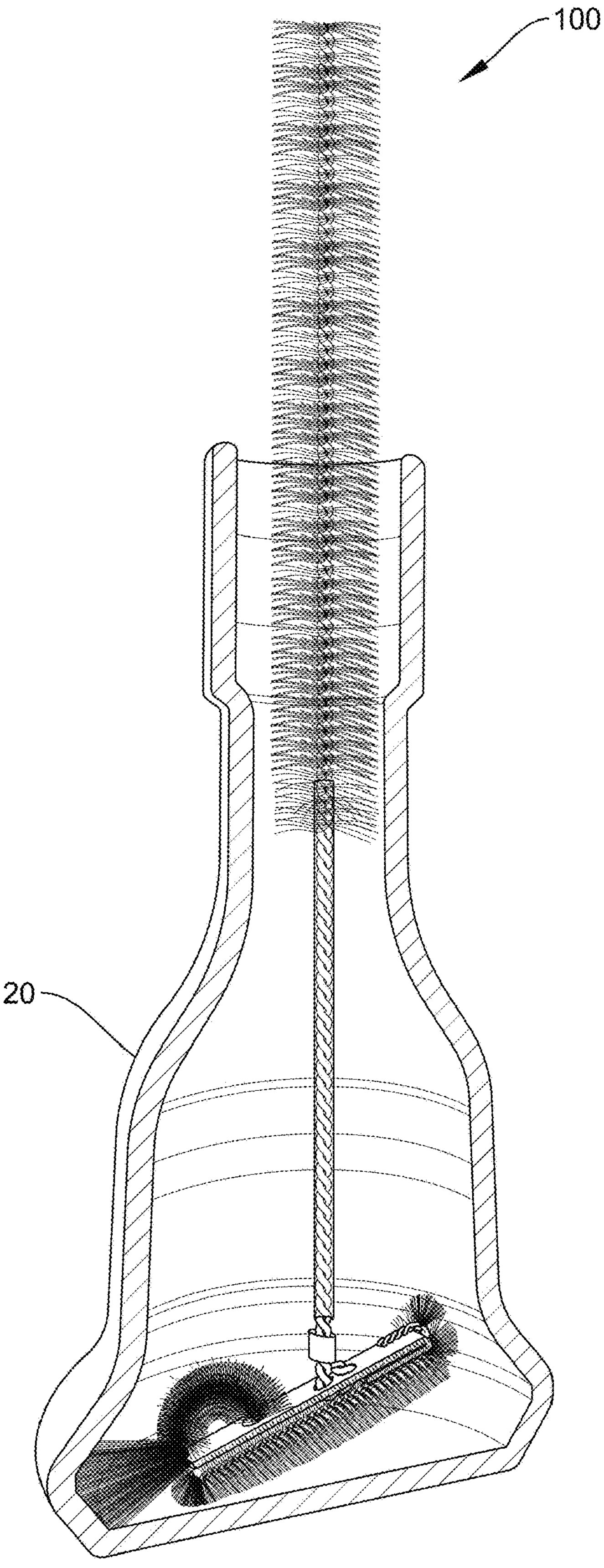
FIG. 9 illustrates further insertion of the cleaning brush into the container of FIG. 7, according to an exemplary embodiment of the present invention.
Figure 10:
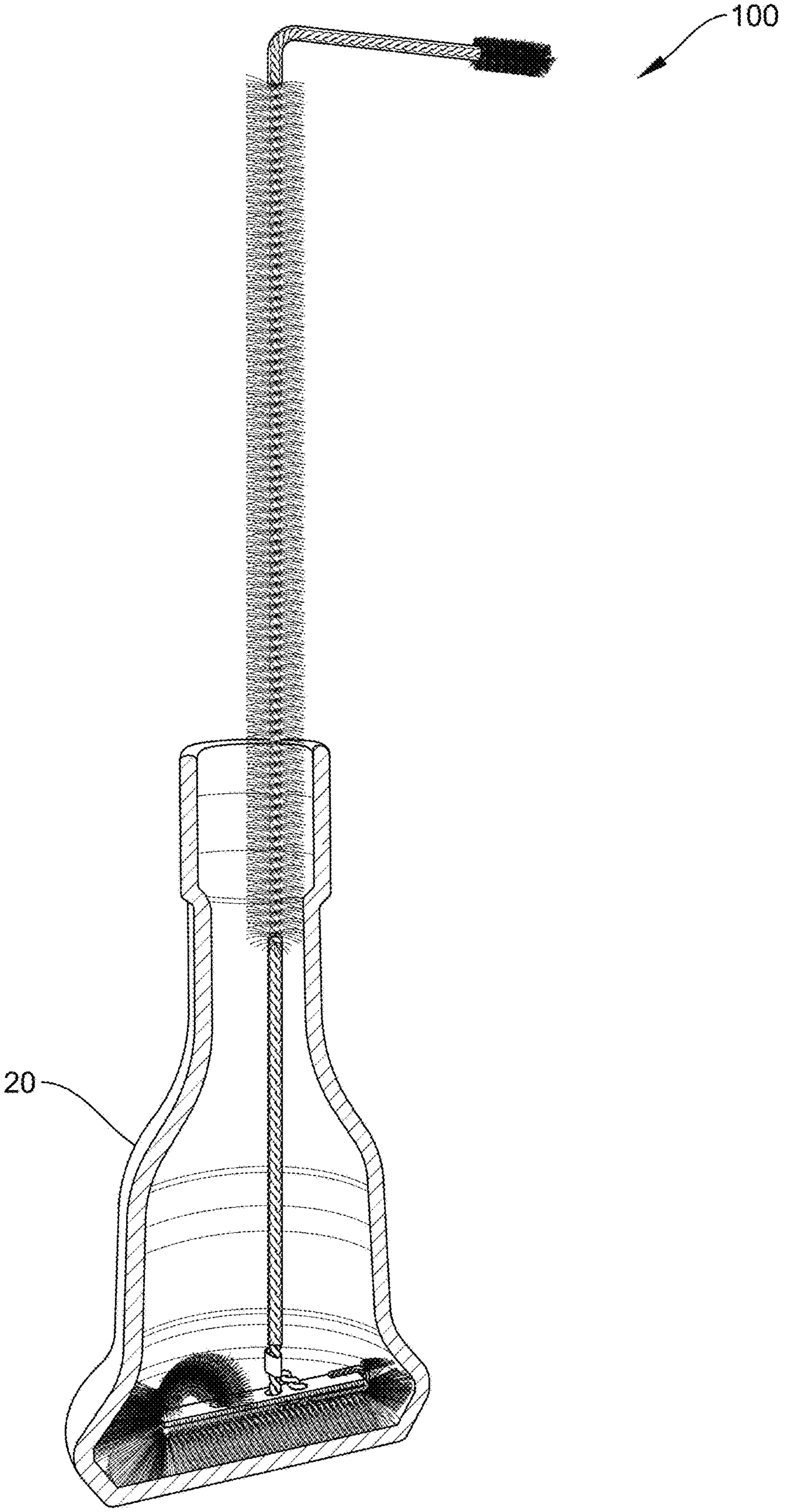
FIG. 10 illustrates the cleaning brush at bottom of the container of FIG. 7, according to an exemplary embodiment of the present invention.

FIGS. 7-10 shows steps in the insertion of the disclosed cleaning brush 100 into container 10 with wide and rounded bottom and a long narrow neck. The cleaning head can flex sidewards to substantially align with the twisted wire, as shown in FIG. 7. This configuration of the cleaning head allows the distal portion of the cleaning brush to easily pass through the narrow opening. FIG. 8 shows the cleaning brush further inserted into the container. FIG. 9 shows the cleaning head touching bottom of the container while the middle portion is within the narrow neck. FIG. 10 shows the cleaning head pushed over the bottom of the container and the middle portion in contact with the neck of the container. The brush can now be agitated and moved within the container to clean the complete container at once. The cleaning head can flex while cleaning the wall of the container, thus efficiently cleaning the complex curves of the container.

Figure 11:
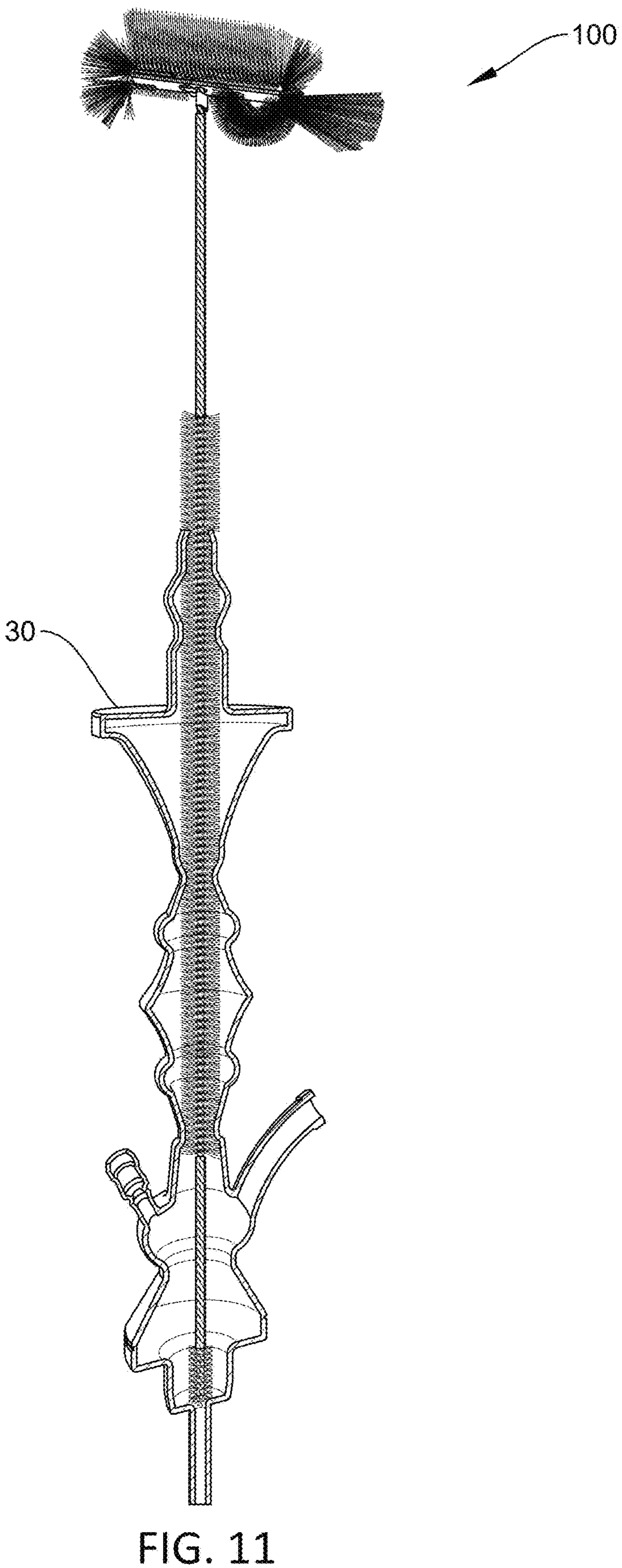
FIG. 11 illustrates the use of a cleaning brush in a hookah, according to an exemplary embodiment of the present invention.

The disclosed cleaning brush can be used to clean the hookah including the container and stem of the hookah. FIG. 11 shows the cleaning brush positioned inside a typical hookah; wherein different sections of the inner hookah come in contact with the bristles of the cleaning brush. The cleaning brush can be used at both ends, i.e., at the cleaning head or the handle portion to effect abrasive cleaning action.

As shown in FIGS. 4 and 5, the two holes through which the twisted wire passes are not at the center of the plate but are offset to the center. The portion of the plate left to the twisted wire joint is longer than the opposite right side portion of the plate. This is a critical feature of the invention and allows the cleaning head to be withdrawn from the container. The longer left side, upon lifting the cleaning head, first touches the wall of the container which causes the short right side to rise towards the twisted wire, and the cleaning brush in this configuration can be pulled out through the narrow stem of the container. Also, the right side of the plate has a bent portion 280 for balancing the position of the plate against the twisted wire.

In one case, the twisted wire can be about 20 inches in length. The small bristle portion at the proximal end of the cleaning brush can be about 0.5 inches followed by 4 inches of exposed twisted wire having the sleeve. The middle portion can be about 10 inches followed by about 5.5 inches of exposed twisted wire.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A cleaning brush comprising:

a twisted wire having a proximal end and a distal end, the twisted wire has a top portion adjacent to the proximal end, a bottom portion adjacent to the distal end, and a middle portion extends between the top portion and the bottom portion, the middle portion has bristles, the top portion and the bottom portion are configured as handles; and a cleaning head coupled to the distal end of twisted wire, the cleaning head comprises:

a plate, the plate has two holes closely spaced apart from each other, the distal end of the twisted wire loops through the two holes for securing the cleaning head to the twisted wire, and a second twisted wire extends longitudinally between two ends of the plate, the second twisted wire has bristles.

2. The cleaning brush according to claim 1, wherein the cleaning brush further comprises:

a first sleeve encasing the top portion.

3. The cleaning brush according to claim 2, wherein the cleaning brush further comprises:

a second sleeve encasing the bottom portion.

4. The cleaning brush according to claim 3, wherein the first sleeve and the second sleeve are made of silicon.

5. The cleaning brush according to claim 2, wherein the top portion has a proximal end portion having bristles, wherein a portion of the top portion between the proximal end portion and the middle portion is configured as the handle and extends within the first sleeve.

6. The cleaning brush according to claim 5, wherein the bristles in the second twisted wire are longer than the bristles in the middle portion, wherein the bristles in the proximal end portion are shorter than the bristles in the middle portion.

7. The cleaning brush according to claim 1, wherein the two holes comprise a first hole and a second hole, the first hole is adjacent to a first end of the plate and the second hole is adjacent to a second end of the plate, the second end is opposite the first end, wherein the first hole and the second hole are aligned along a longitudinal axis of the plate so that the plate is capable of flexing sidewards.

8. The cleaning brush according to claim 7, wherein a distance between the first end and the first hole is more than a distance between the second end and the second hole.

9. The cleaning brush according to claim 1, wherein the bristles in the second twisted wire are longer than the bristles in the middle portion.

10. A method of cleaning a container having a broad base and an elongated stem, the method comprises:

providing a cleaning brush comprising:

a twisted wire having a proximal end and a distal end, the twisted wire has a top portion adjacent to the proximal end, a bottom portion adjacent to the distal end, and a middle portion extends between the top portion and the bottom portion, the middle portion has bristles, the top portion and the bottom portion are configured as handles, and a cleaning head coupled to the distal end of twisted wire, the cleaning head comprises:

a plate, the plate has two holes closely spaced apart from each other, the distal end of the twisted wire loops through the two holes for securing the cleaning head to the twisted wire, and a second twisted wire extends longitudinally between two ends of the plate, the second twisted wire has bristles.

11. The method according to claim 10, wherein the cleaning brush further comprises:

a first sleeve encasing the top portion.

12. The method according to claim 11, wherein the cleaning brush further comprises:

a second sleeve encasing the bottom portion.

13. The method according to claim 12, wherein the first sleeve and the second sleeve are made of silicon.

14. The method according to claim 11, wherein the top portion has a proximal end portion having bristles, wherein a portion of the top portion between the proximal end portion and the middle portion is configured as the handle and extends within the first sleeve.

15. The method according to claim 14, wherein the bristles in the second twisted wire are longer than the bristles in the middle portion, wherein the bristles in the proximal end portion are shorter than the bristles in the middle portion.

16. The method according to claim 10, wherein the two holes comprise a first hole and a second hole, the first hole is adjacent to a first end of the plate and the second hole is adjacent to a second end of the plate, the second end is opposite the first end, wherein the first hole and the second hole are aligned along a longitudinal axis of the plate so that the plate is capable of flexing sidewards.

17. The method according to claim 16, wherein a distance between the first end and the first hole is more than a distance between the second end and the second hole.

18. The method according to claim 10, wherein the bristles in the second twisted wire are longer than the bristles in the middle portion.

* * * * *